(12) United States Patent
Togasawa et al.

(10) Patent No.: US 6,598,624 B2
(45) Date of Patent: Jul. 29, 2003

(54) APPARATUS AND PROCESS FOR RAPIDLY FILLING WITH HYDROGEN

(75) Inventors: Shuichi Togasawa, Saitama (JP); Akifumi Otaka, Saitama (JP); Akira Yamada, Saitama (JP); Koichi Takaku, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/878,812

(22) Filed: Jun. 11, 2001

(65) Prior Publication Data

US 2002/0014277 A1 Feb. 7, 2002

(30) Foreign Application Priority Data

Jun. 9, 2000 (JP) ........................................ 2000-174503

(51) Int. Cl.⁷ ................................................. B65B 1/04
(52) U.S. Cl. ............................. 141/1; 141/95; 141/198
(58) Field of Search .......................... 141/1, 2, 18, 94, 141/95, 192, 198, 83

(56) References Cited

U.S. PATENT DOCUMENTS 5,551,490 A * 9/1996 Kountz et al. ................ 141/18
5,570,729 A   11/1996 Mutter ......................... 141/18
5,597,020 A * 1/1997 Miller et al. .................. 141/18
5,628,349 A * 5/1997 Diggins et al. ................ 141/3
6,397,905 B1 * 6/2002 Mayer et al. ................ 141/188

FOREIGN PATENT DOCUMENTS

JP          09-210296          8/1997

* cited by examiner

*Primary Examiner*—Steven O. Douglas
(74) *Attorney, Agent, or Firm*—Lahive & Cockfield, LLP (57) ABSTRACT

An apparatus for rapidly filling a hydrogen tank with a hydrogen gas comprises a hydrogen source; a hydrogen tank; a passage which connects the hydrogen source and said hydrogen tank; and a mechanism for varying the hydrogen-filling rate. The mechanism for varying the hydrogen-filling rate changes the hydrogen-filling rate depending upon the pressure within said hydrogen tank. The apparatus can suppress heat generation at the initial filling stage where the temperature is easily increased. Also, even if it takes longer time for increasing the pressure within the hydrogen tank at the initial filling state, the delayed time can be caught up and, the apparatus and the process of the present invention can totally attain a rapidly filling with hydrogen.

20 Claims, 8 Drawing Sheets

APPARATUS AND PROCESS FOR RAPIDLY FILLING WITH HYDROGEN

BACKGROUND ARTS

1. Field of the Invention

The present invention relates to an apparatus and process for rapidly filling a hydrogen tank with hydrogen while suppressing exothermic phenomenon during the course of filling.

2. Description of Related Arts

Recently, from the viewpoint of the expression of the amount of carbon dioxide exhausted, vehicles utilizing hydrogen ($H_2$) as a fuel, such as fuel cell carried vehicle and hydrogen engine vehicle, have been focused. Such a vehicle carries a hydrogen tank, and the hydrogen having been introduced in the hydrogen tank is supplied into a fuel cell or an engine to generate a drive force.

The hydrogen tank is filled with hydrogen (pure hydrogen) at a pressure of approximately 20 Mpa. The pressure within the hydrogen tank is decreased as the hydrogen is consumed with the fuel cell, etc. If the pressure within the hydrogen tank is decreased, the residue of the hydrogen is decreased accordingly, making it impossible to supply the hydrogen into the fuel cell, etc. In such a case, the hydrogen tank is filled or refilled with fresh hydrogen. For example, the fuel cell carried vehicle or hydrogen engine vehicle stops at a so-called hydrogen station at which the tank provided within the vehicle is filled with hydrogen.

A vehicle having (compressed) natural gas carried thereon (also referred to as "CNG vehicle") has been known which utilize natural gas as a fuel. A natural gas tank is filled with a natural gas, for example, by connecting a natural gas source provided on a natural gas stand to the natural gas tank, and introducing the natural gas into the natural gas tank due to the pressure difference between them.

For example, Japanese Utility Model Laid-Open Publication No. 4-64699 discloses "an apparatus for supplying compressed natural gas into a vehicle utilizing the compressed natural gas as a fuel", in which a high pressure accumulator (which utilizes a later filling stage) and a pressure-variable accumulator (which utilizes a former filling stage) are switched to be used. This makes it possible to maintain the pressure of the natural gas source at a high temperature and then to repeatedly fill the natural gas cylinder with the natural gas in a rapid manner.

In the case where the natural gas tank (fuel cylinder) is filled with the natural gas, an endothermic phenomenon due to the Joule-Thomson effect and exothermic phenomenon due to the adiabatic compression take place at the same time and thus, the heat caused is almost offset, the temperature of the natural gas being somewhat decreased. Consequently, there is no problem associated with the heat generation when the natural gas is incorporated.

However, differing from the natural gas, hydrogen has an inversion temperature in the Joule-Thomson effect of 202 K (approximately −71° C.), which is lower than the normal temperature and, thus, once the compressed hydrogen having a temperature of about normal temperature expands, the heat is generated to increase the temperature of hydrogen. Consequently, when a hydrogen tank is filled with hydrogen, the temperature of hydrogen introduced and the temperature of the hydrogen tank itself become higher, due to (a) heating-up caused by diabolically increasing the pressure within the hydrogen tank and due to (b) heating-up caused by subjecting hydrogen to expand from the hydrogen source, which has a pressure higher than that of the hydrogen tank, into the hydrogen tank (in which case, an amount of heat generated is considerably lower as in case of the diabolic compression). Specifically, unlike the natural gas, no cooling effect takes place in the case of filling with hydrogen even by subjecting hydrogen to expand into the hydrogen tank and, therefore, the temperature of hydrogen filled and the temperature of the hydrogen tank itself become unduly higher. Increasing the temperature of hydrogen filled and the temperature of the hydrogen tank itself is disadvantageous in terms of causing failure or deterioration of fittings such as PRD (pressure-relief device) and a tank liner, provided on the hydrogen tank and decreasing filling efficiency. When the hydrogen tank is made up of a fiber-reinforced plastic (C-FRP or G-FRP) in order to reduce the weight of the hydrogen tank for the purpose of improving the fuel efficiency, the heat accelerates the deterioration of the plastic. Consequently, there is an object to fill the hydrogen tank with hydrogen while suppressing the increase in the temperature of the hydrogen tank.

Also, it is important for attaining easy operability of the fuel cell carried vehicle, etc. to rapidly fill the hydrogen tank with hydrogen by increasing a filling rate of hydrogen. There is an object to rapidly fill the hydrogen tank with hydrogen without any deceleration of the hydrogen-filling rate.

SUMMARY OF THE INVENTION

The main object of the present invention is to provide an apparatus and process for filling with hydrogen, which solve the above object.

We have conducted serious studies in light of the above object, As a result, we have accomplished the present invention on the basis of the fact that the temperature of hydrogen within the hydrogen tank arrives at the maximum level in the considerable earlier stage immediately after the initiation of filling with hydrogen, and it levels off or is decreased thereafter, i.e., the temperature of hydrogen within the hydrogen tank (the temperature of the hydrogen tank) being decided at the earliest stage, etc.

According to the first aspect of the present invention there is provided an apparatus for rapidly filling a hydrogen tank with a hydrogen gas comprising:

a hydrogen source;

a hydrogen tank;

a passage which connects said hydrogen source and said hydrogen tank; and a mechanism for varying a hydrogen-filling rate;

said mechanism for varying a hydrogen-filling rate changing the hydrogen-filling rate depending upon the pressure within said hydrogen tank.

When the hydrogen filling rate is increased, the amount of heat generated becomes higher accordingly, which increases the range of increasing the temperature within the hydrogen tank. Conversely, if the hydrogen filling rate is decreased, the amount of heat generated becomes lower accordingly, which decreases the range of increasing the temperature within the hydrogen tank. When the pressure within the tank is increased with the progress of the filling the hydrogen tank with hydrogen, the heat generation due to the adiabatic compression is decreased.

In the apparatus according to the present invention, the tank is filled with hydrogen at a decreased filling rate at the initial filling stage where a large amount of heat is generated, and a filling rate is increased as an amount of heat is decreased. By such a configuration, the heat generation at the initial filling stage where the temperature is easily increased can be suppressed. Also, since a filling rate is increased depending upon the pressure within the tank, even if it takes longer time for increasing the pressure within the hydrogen tank at the initial filling state, the delayed time can be caught up and, the apparatus and the process of the present invention can totally attain a rapidly filling with hydrogen.

FIRST EMBODIMENT

In the apparatus of the present invention, said mechanism preferably has a function of introducing the hydrogen gas into the hydrogen tank at a high filling rate when the pressure within said hydrogen tank is increased.

Also, in the apparatus according to the present invention, said mechanism for varying a hydrogen-filling rate preferably comprises a filling rate variable valve having a function of changing the hydrogen filling rate depending on the pressure within the hydrogen tank at the time of hydrogen-filling.

In the apparatus where the mechanism has a function of introducing the hydrogen gas into the hydrogen tank at a high filling rate when the pressure within said hydrogen tank is increased, the mechanism for varying a hydrogen-filling rate preferably comprises a filling rate variable valve having a function of changing the hydrogen filling rate depending on the pressure within the hydrogen tank at the time of hydrogen-filling.

In the preferred embodiment of the apparatus according to the present invention just mentioned, the valve preferably possesses a valve element which is movable depending upon the pressure within the hydrogen tank to allow the hydrogen to be introduced for flowing through a passage formed between said valve element and said valve seat, and wherein said passage is widened to increase the hydrogen-filling rate, when the pressure within the tank is increased. In this apparatus, it is desired that at least one of said valve element and said valve seat possesses at least one orifice so that even if said passage formed between said valve element and said valve seat is closed due to a low pressure within the hydrogen tank, the hydrogen tank is filled with hydrogen through said orifice.

Also, in the apparatus, the valve element is moved by a pushing member such as a spring According to this configuration, since the hydrogen is incorporated into the hydrogen tank while restricting the flow amount by the contract means, the increase in the temperature within the hydrogen tank can be suppressed. When the increase in the temperature within the hydrogen tank is suppressed, the filling efficiency can be enhanced, making it possible to fill the hydrogen tank with hydrogen in a rapid manner.

SECOND EMBODIMENT

In another preferred embodiment of the apparatus according to the present invention, the mechanism preferably comprises a valve, a sensor which detects the pressure within the hydrogen tank, and a controller which controls said valve to vary the hydrogen-filling rate depending upon the pressure detected by said sensor.

In the apparatus just mentioned, it is preferred that said controller controls the valve such a manner that the hydrogen gas is introduced into said hydrogen tank at a first hydrogen-filling rate when the pressure within the hydrogen tank is lower than a predetermined pressure, while the hydrogen gas is introduced into said hydrogen tank at a second hydrogen-filling rate which is higher than said first hydrogen filling rate when the pressure within the hydrogen tank is not lower than the predetermined pressure.

Also it is preferred that said valve used varies the hydrogen-filling rate via a stepping motor.

According to this configuration, the hydrogen passage becomes wider or narrower depending upon the inner pressure within the hydrogen tank. Specifically, the passage becomes narrower as the inner pressure is decreased, and the passage becomes wider as the inner pressure is increased. Consequently, a filling rate is restricted at the initial filling stage, and the restriction is gradually released as the filling stage progresses, i.e., the inner pressure is increased with the progress of the stage.

PROCESS

According to the present invention, there is also provided a process for rapidly filling a hydrogen tank with a hydrogen gas from a hydrogen source by connecting said hydrogen tank with said hydrogen source comprising: initiating the introduction of hydrogen from said hydrogen source into said hydrogen tank; and varying the hydrogen-filling rate depending upon the pressure within said hydrogen tank.

In the process according to the present invention, the hydrogen filling rate is preferably changed when the pressure within said hydrogen tank is increased.

When the hydrogen filling rate is increased, the amount of heat generated becomes higher accordingly, which increases the range of increasing the temperature within the hydrogen tank. Conversely, if the hydrogen filling rate is decreased, the amount of heat generated becomes lower accordingly, which decreases the range of increasing the temperature within the hydrogen tank. When the pressure within the tank is increased with the progress of the filling the hydrogen tank with hydrogen, the heat generation due to the adiabatic compression is decreased.

In the process according to the present invention, the tank is filled with hydrogen at a decreased filling rate at the initial filling stage where a large amount of heat is generated, and a filling rate is increased as an amount of heat is decreased. By such a configuration, the heat generation at the initial filling stage where the temperature is easily increased can be suppressed. Also, since a filling rate is increased depending upon the pressure within the tank, even if it takes longer time for increasing the pressure within the hydrogen tank at the initial filling state, the delayed time can be caught up and, the apparatus and the process of the present invention can totally attain a rapidly filling with hydrogen.

BRIEF DESCRIPTION OF THE DRAWINGS

FIG. 5 shows a cross-sectional view of a device for varying a filling rate according to a first variant of the present invention, where

FIG. 7 shows a cross-sectional view of a controller for varying a filling rate according to a second variant of the present invention, where

FIG. 9 shows a cross-sectional view of a controller for varying a filling rate according to a fourth variant of the present invention, where

DESCRIPTION OF PREFERRED EMBODIMENTS

Embodiments and variants of the present invention will now be described by referring to the attached drawings. However, it should be noted that the present invention should not be restricted thereto.

First, the configuration of the apparatus for rapidly filling a hydrogen tank with hydrogen will now be described.

Figure 1:
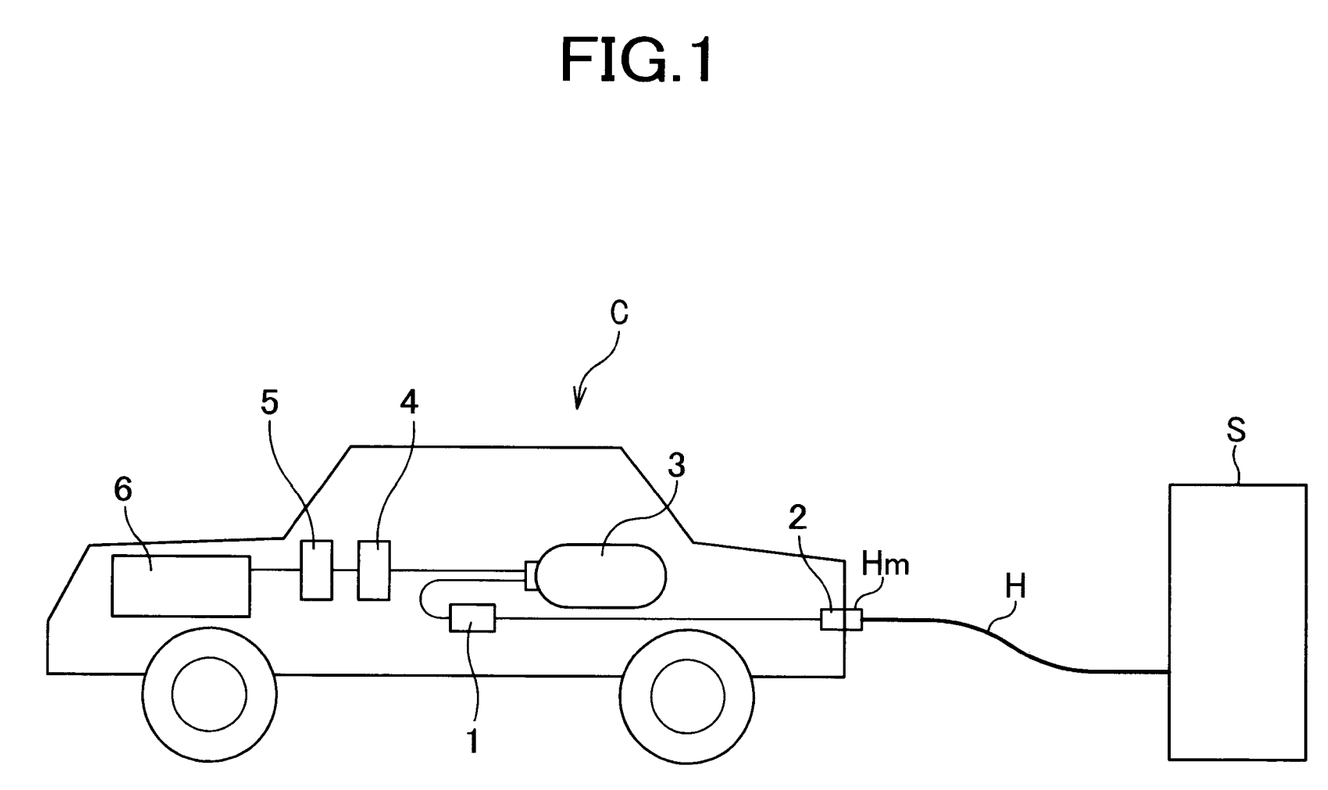
FIG. 1 is a block diagram showing the configuration for carrying out the process for rapidly filling a hydrogen tank with hydrogen according to the present invention.

FIG. 1 is a block diagram showing the configuration for carrying out the process for rapidly filling a hydrogen tank with hydrogen according to the present invention. The configuration of the apparatus according to the present invention is described by referring to FIG. 1.

A hydrogen source S shown in FIG. 1 is composed of a high temperature compressor and a pressure storage tank, and supplies hydrogen having been compressed to a high pressure of from 25 MPa to 40 MPa into a tank 3, which will be described later on. The hydrogen in the hydrogen source S is pure hydrogen. In order to supply the hydrogen to a vehicle C utilizing the hydrogen as a fuel, the hydrogen source S possesses a high pressure hose H equipped with a mouth ring Hm, which will be connected to a hydrogen inlet provided on the vehicle C.

The vehicle C depicted on FIG. 1 possesses a device 1 for varying a filling rate, a hydrogen inlet 2, a hydrogen tank 3 (hereinafter simply referred to as "tank"), a filter 4, a pressure reducing valve 5, a fuel cell 6 or an engine 6 (hereinafter referred to as "fuel cell"), and the like.

In this embodiment, the device 1 for varying a filling rate is provided between the hydrogen inlet 2 and the tank 3. The device 1 for varying a filling rate increases a hydrogen filling rate when the inner pressure of the tank 3 is not more than a given pressure, and decreases a hydrogen filling rate when the inner pressure of the tank 3 exceeds the given pressure. The device 1 for varying a filling rate is mainly composed of an orifice having an inner diameter of not more than 1.3 mm, a solenoid valve provided parallel to the orifice, a pressure sensor for detecting a pressure downstream the device 1 for varying a filling rate (inner pressure of the tank 3 (or inner pressure)), a controller which inputs the signal detected from the pressure sensor, and which switches the position of the solenoid valve from the breaking position to the communication position when the detected signal exceeds a given value (a give pressure), etc. The solenoid valve serves as a bypass valve for the orifice. When the solenoid valve is switched to the communication position, a filling rate is increased.

The hydrogen inlet 2 corresponds to a gasoline inlet in a gasoline-powered vehicle, and is connected to the mouth ring Hm of the high pressure hose. The hydrogen inlet 2 is equipped with a check valve, and can be connected to the mouth ring Hm with one touch operation.

The tank 3 corresponds to a gasoline tank in a gasoline-powered vehicle. The tank 3 stores hydrogen supplied from the hydrogen source S at a high pressure of approximately 25 Mpa, and supplies the hydrogen into the fuel cell 6. The tank 6 is a composite container made, for example, of aluminum and a resin-made liner and stores up to approximately 25 $m^3$ of hydrogen as a normal pressure.

The filter 4 removes dust etc. in the hydrogen to be supplied from the tank 3 to the fuel cell 6. The pressure reducing valve 5 reduces the pressure of the hydrogen from the tank 3 to supply the fuel cell 6.

The fuel cell 6 is an electric power generator which generates power utilizing the hydrogen supplied from the tank 3 and the oxygen contained in the air. The electricity generated is supplied to a motor (not shown) to generate a drive force.

Next, a process for rapidly filling a hydrogen tank with hydrogen will now be described by referring to FIGS. 1 to 3. The process is carried out in the apparatus according to the present invention described above.

Figure 2:
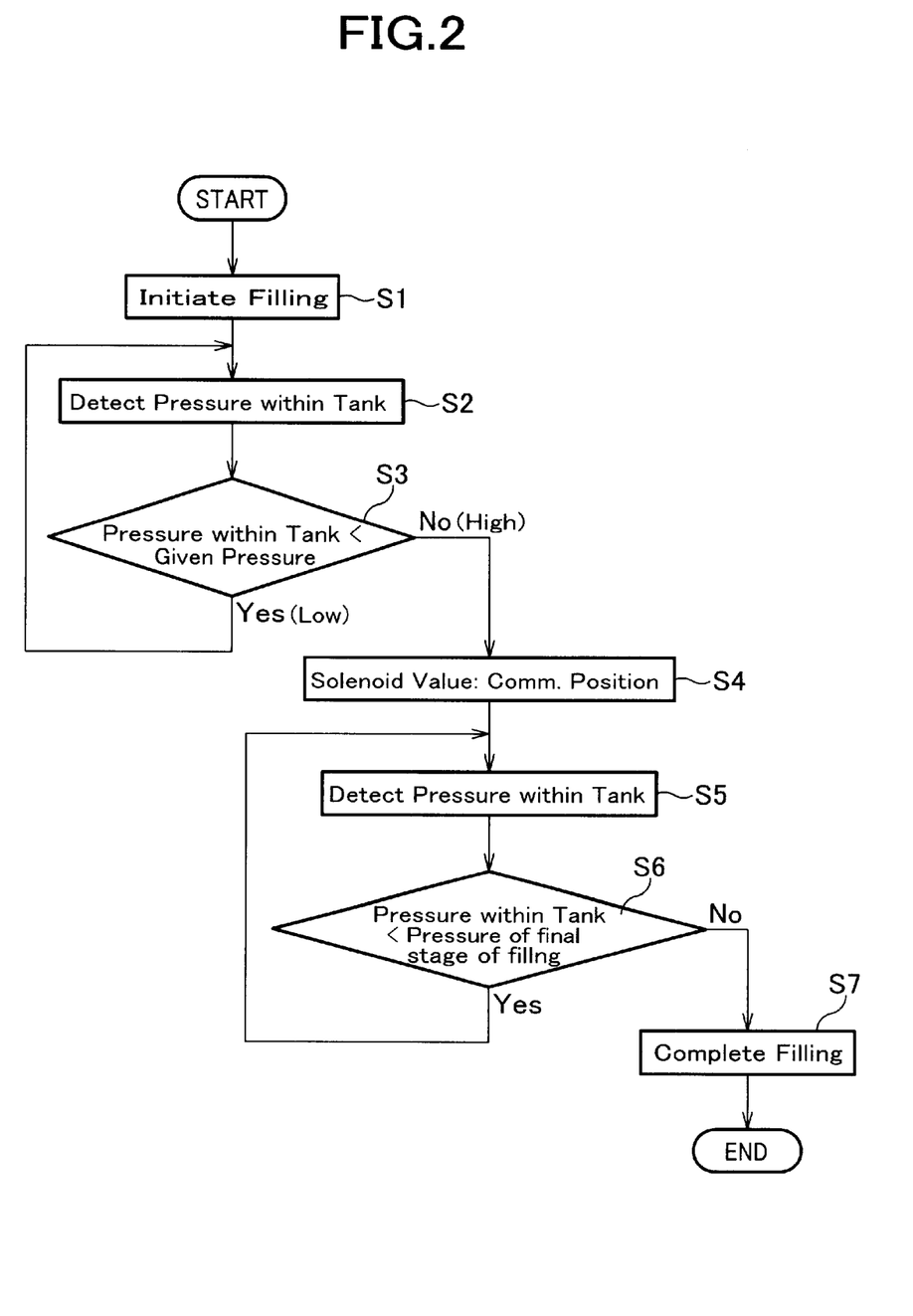
FIG. 2 is a flowchart of the process for rapidly filling a hydrogen tank with hydrogen.
Figure 3:
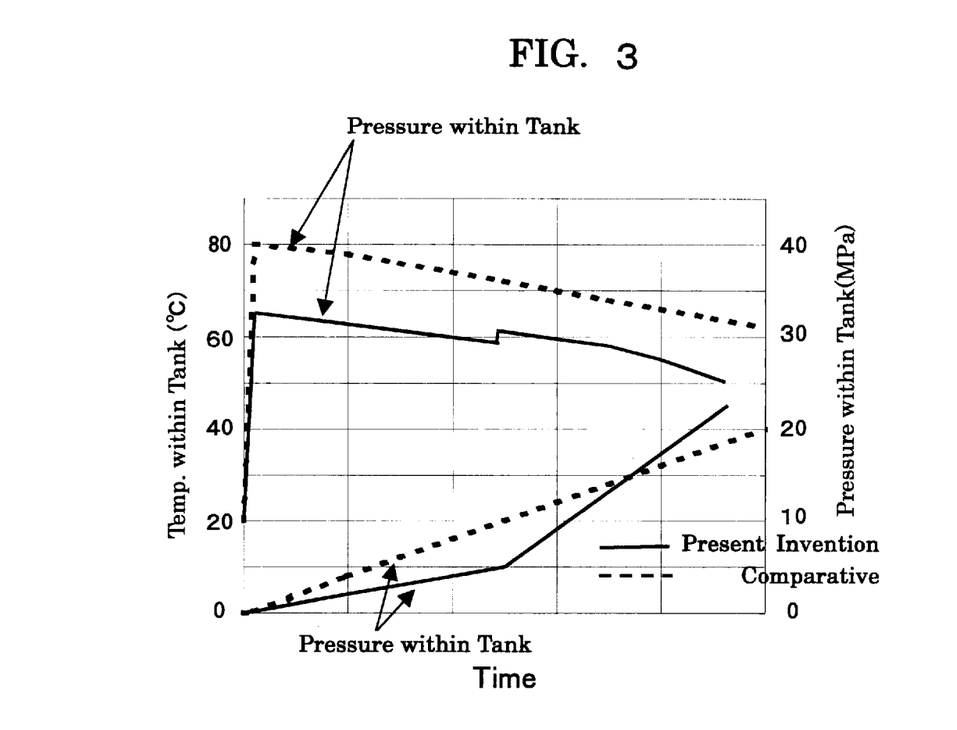
FIG. 3 is a time chart showing the changes in the pressure of the tank and the inner temperature at the time of filling the tank with hydrogen according to the process of the present invention.

FIG. 2 is a flowchart of the process for rapidly filling a hydrogen tank with hydrogen, and FIG. 3 is a time chart showing the changes in the pressure of the tank and the inner temperature at the time of filling the tank with hydrogen according to the process of the present invention. In FIG. 3, the real line shows the time chart of the present invention and the broken line shows the time chart of Comparative Example of the prior art. In Comparative Example, a filling rate is substantially kept at constant.

First, when the vehicle C is filled with hydrogen, the vehicle C stops in a hydrogen-filling station, and the vehicle C is connected to the hydrogen source S (the mouth ring Hm and the hydrogen inlet 2 are connected to each other in a pressure resistant, gas-tight manner). In this case, the tank 3 is almost empty (0 MPa) (see FIG. 3). The solenoid valve of the device for varying a filling rate 1 is in the breaking position. The hydrogen source S can fill the tank 3 with the hydrogen at a pressure sufficiently higher than the pressure of the tank 3 after the completion of the filling. The hydrogen source S never changes the original filling pressure during the course of filling the vehicle with hydrogen.

First, filling is initiated (S1). Since the solenoid valve is in the breaking position, the tank 3 is filled with hydrogen via the orifice at which the hydrogen-filling rate is restricted. When the hydrogen-filling rate is restricted, the amount of exothermic heat generated due to adiabatic compression becomes small. Accordingly, in comparison with Comparative Example where a filling rate is not restricted, the increase in the temperature within the tank 3 becomes remarkably small (see FIG. 3). The term "temperature within the tank 3" indicates the temperature of the hydrogen introduced into the tank 3 (the temperature at the central portion of the gas tank). The increase in the temperature suddenly takes place.

Next, in step S2, the pressure within the tank (inner pressure) is detected, and the detected pressure within the tank is compared with a predetermined pressure (e.g., 5 MPa) (S3). If the detected pressure within the tank is lower than the predetermined pressure, the tank 3 is continuously filled with the hydrogen.

There is a suspicion that if the tank 3 is continuously filled with the hydrogen, the exothermic heat is further generated to increase the temperature within the tank 3. However, the pressure ratio before and after the compression in the adiabatic compression becomes small as the filling progresses (because the inner pressure of the tank is increased). For this reason, the exothermic heat gradually becomes small. The generated heat is transmitted to the tank 3, and then discharged from the tank 3. Consequently, under the situation where a filling rate is restricted, the temperature is not sharply increased, and the peak of the temperature within the tank appears at the initial filling stage (see FIG. 3). When the pressure within the tank is further increased (i.e., when the tank is filled with hydrogen in some degrees), the heat generated is sifted to the hydrogen having being filled; further exothermic heat due to the adiabatic compression does not take place in a great degree (the exothermic heat is diluted with (absorbed in) the hydrogen having being filled). What is more, if the exothermic heat due to the adiabatic compression becomes small, the hydrogen is introduced into the tank 3 without increasing the temperature. Consequently, the temperature is conversely decreased.

When the filling is continued, the pressure within the tank is increased. In step S3, the pressure within the tank is compared with the predetermined pressure, and if the pressure within the tank 3 exceeds the predetermined pressure, the solenoid valve is switched to the communication position (S4). Meanwhile, the hydrogen is introduced not only from the orifice but also from the solenoid valve (bypass valve), increasing a filling rate. At this time, the pressure within the tank is lower than Comparative Example (see FIG. 3). If a filling rate is increased, the exothermic heat temporarily becomes greater, increasing the temperature within the tank.

If a filling rate is increased by switching the solenoid valve to the communication position, the difference in the pressures between this embodiment and Comparative Example is shortened. As described above, even if a filling rate is increased, the exothermic heat due to adiabatic compression is not so large under the situation where the pressure within the tank is increased. Consequently, the hydrogen can be rapidly filled without increasing the temperature within the tank.

In Step S5, the pressure within the tank is detected, and the pressure within the tank is compared with the final filling pressure (e.g., 25 MPa) (S6). If the pressure within the tank is lower, while keeping the solenoid valve at the breaking position, the tank is continuously filled with the hydrogen. Even if the tank is continuously filled with the hydrogen at a high hydrogen-filling rate, the tank can be filled with the hydrogen without increasing the temperature within the tank. Rather, since no adiabatic compression takes place as in the initial filling stage, the relatively cool hydrogen without increasing the temperature enters into the tank 3; thus, the temperature within the tank is decreased.

If the pressure within the tank exceeds the pressure of completing the filling, the filling was terminated (S7). At the time where the filling is completed, the filling time is caught up with Comparative Example. At this time, the pressure within the tank is higher than that of Comparative Example. The reason why the filling time can be caught up with that of Comparative Example is that a large exothermic heat at the initial filling stage can be suppressed (in Comparative Example, the total filling rate cannot be increased considering the exothermic heat at the initial filling stage). Since the temperature within the tank in this embodiment is lower than that in Comparative Example, the pressure drop occurring thereafter in this embodiment is smaller than that in Comparative Example. Consequently, the filling efficiency in this embodiment is better than that in Comparative Example.

As described above, according to the process for rapidly filling a hydrogen tank with hydrogen of this embodiment, the hydrogen can be rapidly introduced into the tank in a simple configuration.

The relation between a filling rate and the range of increasing the temperature within the tank will now be described by referring to FIG. 4.

Figure 4:
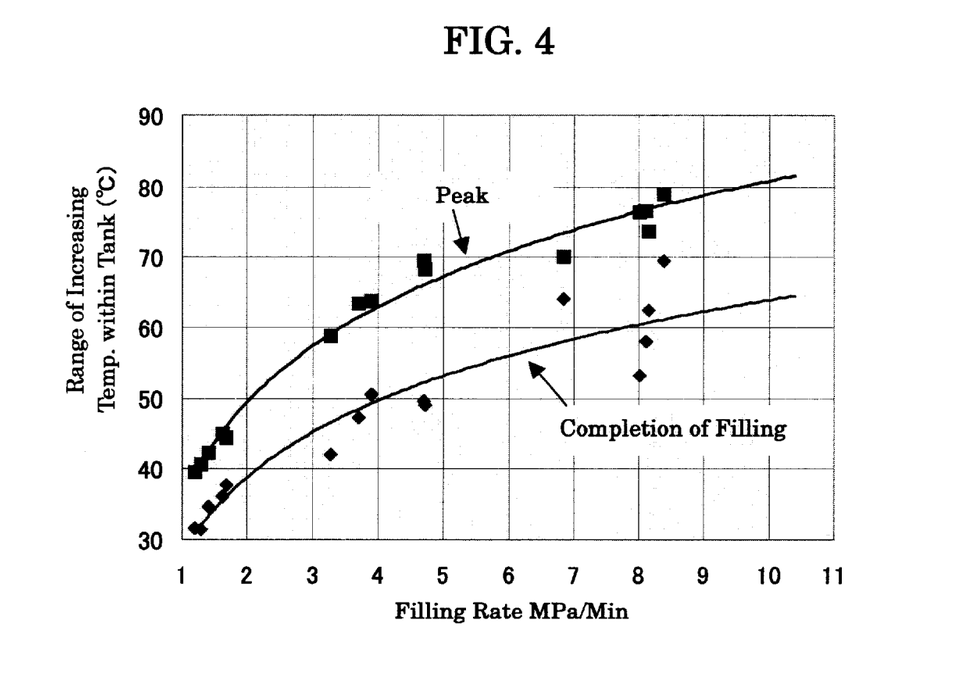
FIG. 4 is a graph showing the relation between a filling rate and the temperature within the tank.

FIG. 4 is a graph showing the relation between a filling rate and the temperature within the tank. The horizontal axis in FIG. 4 indicates a filling rate (MPa/min) and the vertical axis in FIG. 4 is the range of increasing the temperature (°C.)

While both curves depicted on FIG. 4 show the relation between a filling rate and the range of increasing the temperature within the tank, the curve on the upper side (upper curve) shows the range of increasing the temperature within the tank calculated by subtracting the peak temperature wherein the maximum level is recorded from the temperature at the initial filling stage (range of increasing the temperature=the peak temperature–the temperature at the initial filling stage) On the other hand, the range of increasing the temperature within the tank depicted on the lower curve shows the range of increasing the temperature within the tank obtained by subtracting the temperature at the completion of filling from the temperature at the initial filling stage (range of increasing the temperature=the temperature at the completion of filling–the temperature at the initial filling stage).

As is clear from the upper curve, higher a filling rate, the range of increasing the temperature within the tank at peak is lower. On the other hand, it can be understood from the lower curve that higher a filling rate, the range of increasing the temperature within the tank at the completion of filling. Also, it is proven from both curves that the range of increasing the temperature within the tank at the completion of filling does not exceed the range of increasing the temperature within the tank at peak (i.e., the temperature within the tank at the completion of filling is lower than that at peak). Moreover, the peak appears at earlier time immediately after initiation of filling (peak=early time immediately after initiation of filling); thus the temperature may be controlled at the earlier time immediately after initiation of filling.

First Variant of Device for Varying Filling Rate

Next, the first variant of the device for varying a filling rate other than the above embodiment will now be described by referring to FIGS. 5 and 6. In the first variant, the device for varying a filling rate does not positively actuate but is operated in a passive manner.

Figure 5A:
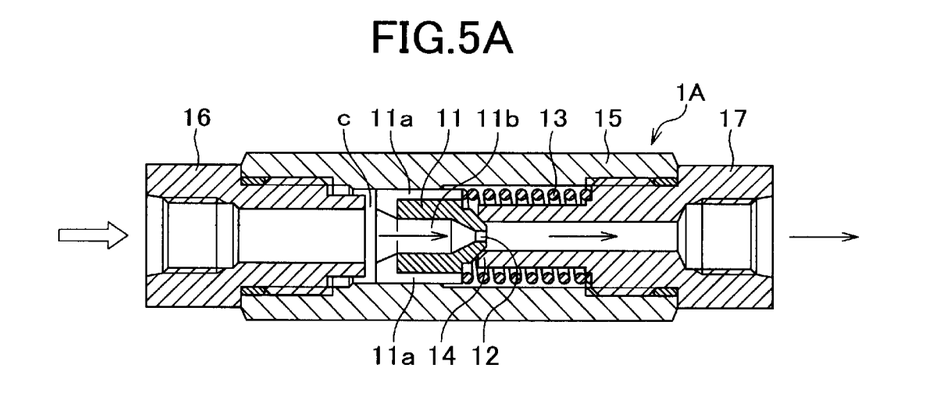
FIG. 5A shows the situation where the valve element is in contact with the valve seat.
Figure 5B:
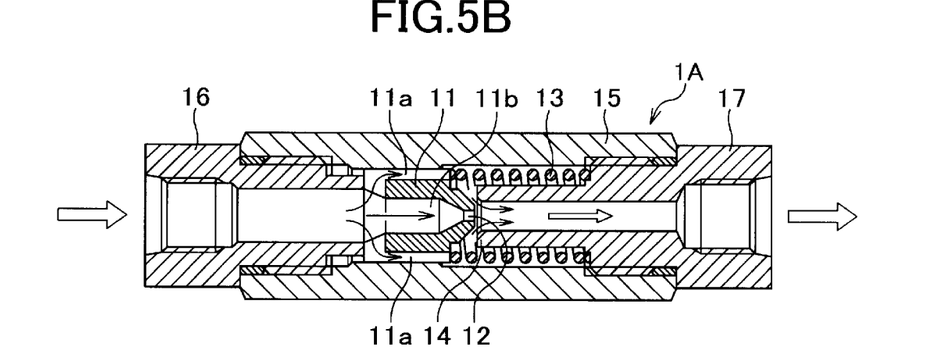
FIG. 5B shows the situation where the valve element is separated from the valve seat.
Figure 6A:
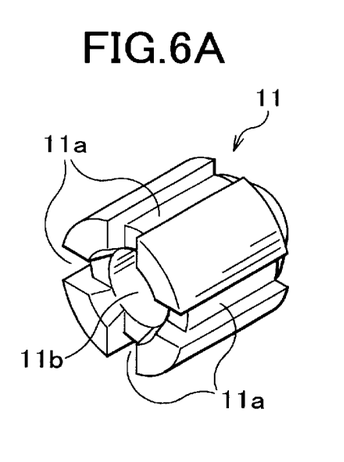
FIG. 6A is a perspective view of the valve element of FIG. 5A viewing from the upstream.

FIG. 5 shows a cross-sectional view of a device for varying a filling rate according to a first variant of the present invention, and FIG. 6 is a perspective view of the valve element of FIG. 5.

As shown in FIG. 5, a device 1A for varying a filling rate is composed mainly of a valve element 11, a pilot passage 12, a pushing member 13, a valve seat 14, a housing 15, a joint 16 of inlet side, a joint 17 of outlet side, and a clearance (gap) formed between the valve element 11 and the joint 16 of the inlet side.

As shown in FIGS. 5A and 5B, the valve element 11 is a cap shaped hollow member having grooves 11a along the shaft line of the valve element on the outer circumference and an inner hollow portion 11b. Four grooves 11 are formed at approximately 90° intervals. These grooves 11a are also formed on the end surface portion at the upstream side of the valve element 11 so that even when the element 11 is pushed toward the upstream side to block the clearance depicted on FIG. 5A, as shown in FIG. 5B, the hydrogen can flow within the device 1A for varying a filling rate (i.e., the grooves 11a have an L-shape). Also, as shown in FIG. 5A, etc., the hollow portion 11b has a shape whose downstream diameter is tapered off to be connected to the pilot passage 12 formed on the valve element 11 not so as to bring about useless pressure loss. The outer shape of the downstream side of the valve element is a tapered shape in which the opening of the valve seat 14 is blocked. As described fully later on, the hydrogen flows into the grooves when the tank pressure (the pressure within the tank) becomes higher. When the strong blast pressure is exposed, the valve element 11 is totally moved toward the downstream side (outlet) to be in contact with the valve seat 14, whereby the flow of the hydrogen flowing between the valve element 11 and the valve seat 14 is blocked.

Figure 6B:
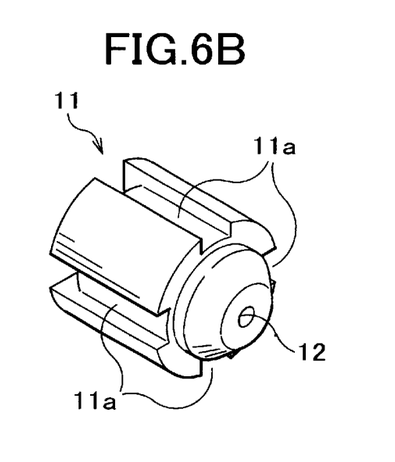
FIG. 6B is a perspective view of the valve element of FIG. 5A viewing from the downstream.

The pilot passage 12 is formed on a position where even when the valve element 11 and the valve seat 14 are brought into contact with each other, the pilot passage 14 is not blocked, i.e., at substantially central portion of the tapered shape portion of the downstream side of the valve element (see FIG. 6B). Consequently, the pilot passage 12 always communicates the inlet of the device 1A for varying a filling rate (upstream side) with the outlet thereof (downstream side), irrelevant to the relation between the valve element 11 and the valve seat 14. The inner diameter (cross-section) of the pilot passage 12 is formed so that a filling rate in the case where the hydrogen is introduced only from the pilot passage 12 is surely lower than a filling rate in the case where the hydrogen is introduced both from the grooves 11a and the pilot passage 12.

As shown in FIG. 5, the pushing member 13 is composed of a panel, etc. In the first variant, the pushing member 13 comprises a spring formed on the joint 17 of the outlet side at the outer circumference of the portion where the valve seat 14 is formed. The pushing member 13 pushes the valve element 11 toward the upstream side (outlet). A pushing force generated by the pushing member 13 is in such a degree that in relation to the blast pressure which moves the valve element 11, the pushing member 13 moves the valve element 11 to be brought into contact with the valve seat 14 when the pressure within the tank is low (i.e., when the blast pressure is high), and the valve element 11 is moved to the upstream side to separate the valve element 11 from the valve seat 14 (in such a degree that no clearance is formed).

The valve seat 14 in the first variant is formed at the upstream side of the joint 17 of the outlet side, and has a shape so as to be in contact with the tapered shape of the valve element 11 at the downstream side when the valve element 11 is moved toward the downstream side.

The housing 15 is composed of a hollow cylindrical member, and accommodates the valve element 11 and the pushing member 13. The joint 16 of the inlet side is inserted into the upstream side of the housing 15 and the joint 17 of the outlet side is inserted into the downstream side thereof.

The joint 16 of the inlet side possesses a hollow passage which allows the hydrogen for flowing and serves as a joint for connecting the device 1A for varying a filling rate to the upstream side of the hydrogen pipe. The joint 17 of the outlet side also possesses a hollow passage which allows the hydrogen for flowing and serves as a joint for connecting the device 1A for varying a filling rate to the downstream side of the hydrogen pipe in a pressure-resistant sealing manner.

The mechanism for enlarging the passage used herein is mainly composed of the valve 11 (grooves 11a), the pushing member 13, the valve seat 14, and the like.

Next, the operation and the function of the device 1A for varying a filling rate according to the first variant will now be described (see FIGS. 1, 5, and 6).

First, the hydrogen source S and the vehicle C are connected with each as in the above embodiment (the mouth ring Hm and the hydrogen inlet 2 are connected in a pressure-resistant sealing manner). The hydrogen filling from the hydrogen source S is initiated. In this case, the tank 3 is assumed to be substantially empty (0 MPa). Also, in this case, the device 1 for varying a filling rate shown in FIG. 1 should be replaced with the device 1A for varying a filling-rate shown in FIG. 5.

When the filling is initiated, since the pressure of the tank 3 (inner pressure of the tank or pressure within the tank) is low, the hydrogen flows through the device 1A for varying a filling rate at a rapid flow rate due to a large pressure difference between the hydrogen source S and the tank 3. Meanwhile, as shown FIG. 5A, the flow of the hydrogen is applied to the valve element 11 as a blast pressure whereby the valve element 11 moves against the pushing force of the pushing member 13 toward the downstream side (blast pressure>pushing force). Subsequently, the valve element 11 is in contact with the valve seat 14.

Consequently, there is no clearance (hydrogen passage) between the valve element 11 and the valve seat 14 (while a clearance c is formed on the upstream side of the valve element 11) to block the flow of the hydrogen. For this reason, the hydrogen is introduced into the tank 3 only through the narrow pilot passage 12. This restricts the hydrogen-filling rate. Once the hydrogen-filling rate is restricted, the exothermic heat due to the adiabatic compression becomes small and, therefore, the increase in the temperature within the tank is remarkably small.

On the other hand, at a middle filling state, the pressure within the tank is gradually increased and the pressure difference between the hydrogen source S and the tank becomes small. In this case, the blast pressure applied to the valve element is decreased accordingly, and the valve element 11 is pushed by the pushing member 13 to be moved back toward the upstream side (blast pressure<pushing force), which forms a clearance between the valve element 11 and the valve seat 14 (see FIG. 5B). When the clearance is formed as described above, the hydrogen flows not only through the pilot passage 12 but also through the grooves 11a, which increases the hydrogen-filling rate.

It is noted that even if the hydrogen-filling rate is increased at this time, the exothermic heat is not so large as at the initial filling stage because the pressure ratio before and after the compression in the adiabatic compression becomes smaller than that at the initial filling stage.

At the final filling stage, the pressure difference between the hydrogen source S and the tank 2 is further decreased, which makes the pushing force of the pushing member strong. Accordingly, the valve element 11 is moved back at the fullest extent toward the upstream side, wide opening the clearance between the valve element 11 and the valve seat 14, whereby the hydrogen flows within the tank in a much more easy manner. In this situation, the clearance c largely formed in FIG. 5A is blocked as shown in FIG. 5B. Consequently, rapid hydrogen-filling can also be performed at the final filling stage.

Second Variant of Device for Varying Hydrogen-Filling Rate

Next, the second variant of the device for varying a filling rate other than the above embodiment will now be described by referring to FIG. 7. In the second variant, the device for varying a filling rate does not positively actuate, e.g., through a solenoid valve, but is operated in a passive manner.

FIG. 7 shows a cross-sectional view of a controller for varying a filling rate according to a second variant of the present invention.

As shown in FIG. 7, a device 1B for varying a filling rate is composed mainly of a valve element 21, a pilot passage 22, a pushing member 23, a valve seat 24, a housing 25, a joint 26 of inlet side, a joint 27 of outlet side, and the like. The symbol o indicates an O-ring for sealing. The symbol p is a pressure-bearing surface on which the valve element 21 receives the inner pressure.

Figure 7A:
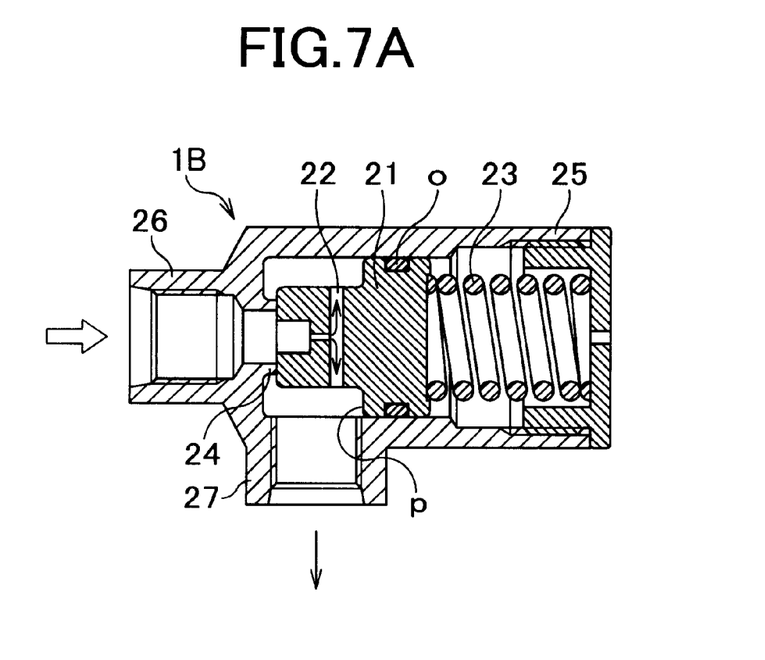
FIG. 7A shows the situation where the valve element is in contact with the valve seat.
Figure 7B:
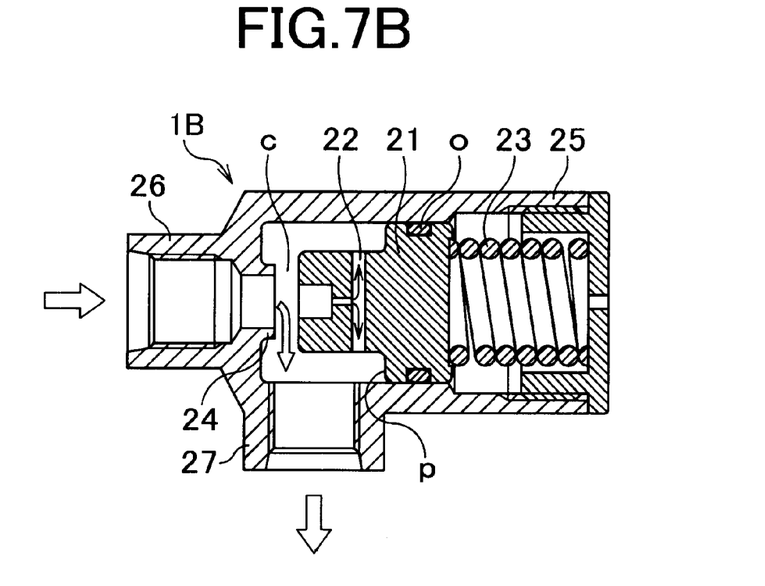
FIG. 7B shows the situation where the valve element is separated from the valve seat.

As shown in FIGS. 7A and 7B, the valve element 21 is a convex member. Usually, the tip convex surface of the valve element 21 is in closely contact with the valve seat 21 which will be described later on so as to block the flow of the hydrogen. The O-ring o is inserted around the later convex portion of the valve element 21 in order to keep the gas-tight (prevention from leakage and prevention from equalization). When the pressure within the tank becomes high, the pressure-bearing surface p is pushed to move the valve element 21 toward the right side as shown in FIG. 7B, whereby a clearance (hydrogen passage) for the hydrogen flowing between the valve element 21 and the valve seat 24 is secured.

The pilot passage 22 is provided within the valve element 21 not so as to be blocked even when the valve element 21 is brought into closely contact with the valve seat 24. Consequently, the pilot passage 22 always communicates the outlet of the device 1B for varying a filling rate (upstream side) with the inlet thereof (downstream side), irrelevant to the relation between the valve element 21 and the valve seat 24. The inner diameter (cross-section) of the pilot passage 22 is formed so that a filling rate in the case where the hydrogen is introduced only from the pilot passage 22 is surely lower than a filling rate in the case where the hydrogen is introduced both from the clearance between the valve element 21 and the valve seat 24 and the pilot passage 22.

The pushing member 23 comprises, for example, a spring. In the second variant, the pushing member 23 is a spring provided on the rear end side of the valve element based on the joint 26 of the inlet side. The pushing member 23 pushes the valve element 21 toward the upstream side (inlet). A pushing force generated by the pushing member 23 is in such a degree that in relation to the blast pressure which moves the valve element 21 toward the rear end side, the pushing member 23 moves the valve element 21 toward the upstream side to be brought into contact with the valve seat 24 when the pressure within the tank is low, and the valve element 21 is moved to the rear end side to separate the valve element 21 from the valve seat 44 (in such a degree that no clearance is formed).

The valve seat 24 in the second variant is formed at the downstream side of the joint 26 of the inlet side, and is brought into closely contact with the valve element 21 when the valve element 21 is moved toward the upstream side.

The housing 25 is composed of a hollow cylindrical member, and accommodates the valve element 21 and the pushing member 23. The joint 26 of the inlet side is formed on the upstream side of the housing 25 and the joint 27 of the outlet side is formed on the downstream side thereof having an angle of 90° relative to the joint 26 of the inlet side.

The joint 26 of the inlet side and the joint 27 of the outlet side each possess a hollow passage which allows the hydrogen for flowing and serves as a joint for connecting the device 1B for varying a filling rate to the hydrogen pipe in a pressure-resistant sealing manner.

The mechanism for enlarging the passage used herein is mainly composed of the valve 21, the pushing member 23, the valve seat 24, and the like.

Next, the operation and the function of the device 1B for varying a filling rate according to the second variant will now be described (see FIGS. 1 and 7).

First, the hydrogen source S and the vehicle C are connected with each as in the above embodiment and the variant (the mouth ring Hm and the hydrogen inlet 2 are connected in a pressure-resistant sealing manner). The hydrogen filling from the hydrogen source S is initiated. In this case, the tank 3 is assumed to be substantially empty (0 MPa). Also, in this case, the device 1 for varying a filling rate shown in FIG. 1 should be replaced with the device 1B for varying a filling rate shown in FIG. 7.

When the filling is initiated, since the pressure of the tank 3 (inner pressure of the tank or pressure within the tank) is low, the hydrogen flows through the device 1B for varying a filling rate at a rapid flow rate due to a large pressure difference between the hydrogen source S and the tank 3. However, since the pushing force of the pushing member 23 shown in FIG. 7A is larger than the pressure within the tank (pressure within the tank>pushing force) in this case, the valve element 21 remains in contact with the valve element 24.

Consequently, there is no clearance between the valve element 21 and the valve seat 24 to block the flow of the hydrogen. For this reason, the hydrogen is introduced into the tank 3 only through the narrow pilot passage 22. This restricts the hydrogen-filling rate. Once the hydrogen-filling rate is restricted, the exothermic heat due to the adiabatic compression becomes small and, therefore, the increase in the temperature within the tank is remarkably small.

On the other hand, at a middle filling state, the pressure within the tank is gradually increased and, the pressure within the tank applied to the pressure-bearing surface p becomes large accordingly. In this case, the valve element 21 is moved toward the rear end side against the pushing force of the pushing member 23 (pressure within the tank>pushing force) to form a clearance c between the valve element 21 and the valve seat 24 (see FIG. 7). When the clearance is formed as described above, the hydrogen flows not only through the pilot passage 12 but also through the clearance, which increases the hydrogen-filling rate.

It is noted that even if the hydrogen-filling rate is increased at this time, the exothermic heat is not so large as at the initial filling stage because the pressure ratio before and after the compression in the adiabatic compression becomes smaller than that at the initial filling stage.

At the final filling stage, the pressure within the tank applied to the pressure-bearing surface p is further increased. Consequently, the valve element 21 is moved toward the rear end side against the pushing force of the pushing member 23 at the fullest extent, wide opening the clearance between the valve element 21 and the valve seat 24, whereby the hydrogen flows within the tank in a much more easy manner. Consequently, rapid filling can also be performed at the final filling stage.

Third Variant of Device for Varying Hydrogen-Filling Rate

Next, the third variant of the device for varying a filling rate other than the above embodiment will now be described by referring to FIG. 8. In the third variant, the device for varying a filling rate does not positively actuate, e.g., through a solenoid valve, but is operated in a passive manner.

Figure 8:
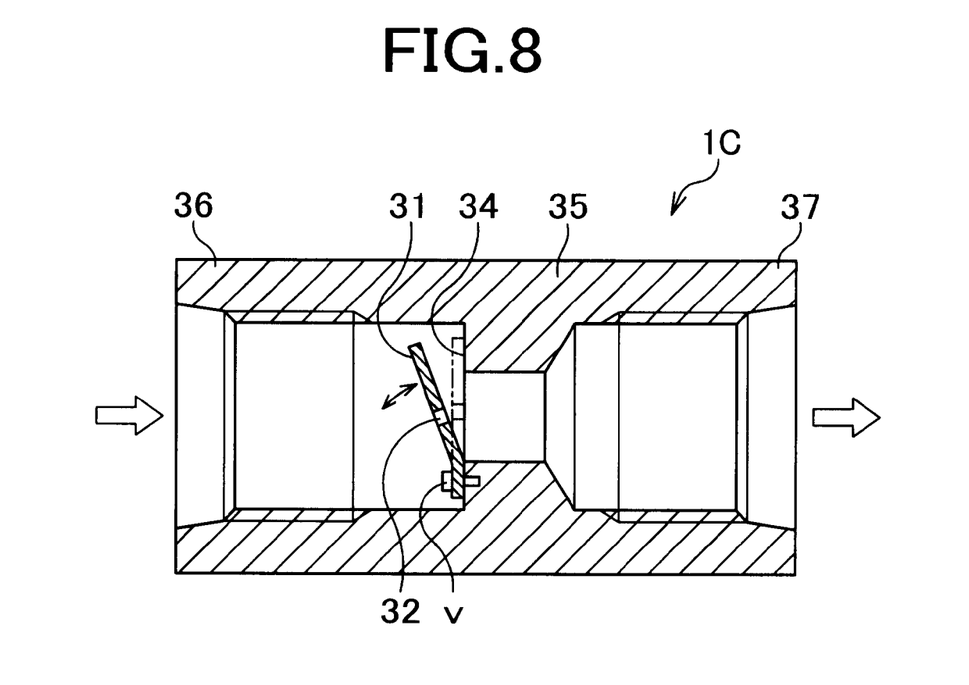
FIG. 8 shows a cross-sectional view of a controller for varying a filling rate according to a third variant of the present invention.

FIG. 8 shows a cross-sectional view of a controller for varying a filling rate according to a third variant of the present invention.

As shown in FIG. 8, a device 1C for varying a filling rate is composed mainly of a valve element 31, a pilot passage 32, a pushing member 33, a valve seat 34, a housing 35, a joint 36 of inlet side, a joint 37 of outlet side, and the like. The symbol v indicates a bolt for fixing the valve element 31.

The valve element 31 shown in FIG. 8 is composed of a plate member having elasticity such as a plate spring. Usually, a clearance (hydrogen passage) is formed between the valve element 31 and the valve seat 34, which will be described later on. On the other hand, when a strong blast pressure due to the flow of the hydrogen is received, the valve element 31 is pushed by the blast pressure to be brought into contact with the valve seat 34 to thereby block the flow of the hydrogen. When the blast pressure becomes weak, due to the resilient force possessed by the valve element 31, the clearance between the valve element 31 and the valve seat 34 is widened.

The pilot passage 32 is formed as a through hole pierced through the valve element 31 so that even when the valve element 31 and the valve seat 34 are brought into contact with each other, the pilot passage 34 is not blocked. Consequently, the pilot passage 32 always communicates the inlet of the device 1C for varying a filling rate (upstream side) with the outlet thereof (downstream side), irrelevant to the relation between the valve element 31 and the valve seat 34. The inner diameter (cross-section) of the pilot passage 32 is formed so that a filling rate in the case where the hydrogen is introduced only from the pilot passage 32 is surely lower than a filling rate in the case where the hydrogen is introduced both from the clearance between the valve element 31 and the valve seat 34 and the pilot passage 32.

The valve seat 34 in the third variant is formed at the downstream side of the joint 36 of the inlet side, and is brought into closely contact with the downstream surface of the valve element 31 when the valve element 31 is moved toward the downstream side.

The housing 35 is composed of a hollow cylindrical member, and accommodates the valve element 31. The joint 36 of the inlet side is formed on the upstream side of the housing 35 and the joint 37.

The joint 36 of the inlet side and the joint 37 of the outlet side each possess a hollow passage which allows the hydrogen for flowing and serves as a joint for connecting the device 1C for varying a filling rate to the hydrogen pipe in a pressure-resistant sealing manner.

The mechanism for enlarging the passage used herein is mainly composed of the valve 31, the pushing member 33, the valve seat 34, and the like.

Next, the operation and the function of the device 1C for varying a filling rate according to the third variant will now be described (see FIGS. 1 and 8).

First, the hydrogen source S and the vehicle C are connected with each as in the above embodiment and the variants (the mouth ring Hm and the hydrogen inlet 2 are connected in a pressure-resistant sealing manner). The hydrogen filling from the hydrogen source S is initiated. In this case, the tank 3 is assumed to be substantially empty (0 MPa). Also, in this case, the device 1 for varying a filling rate shown in FIG. 1 should be replaced with the device 1C for varying a filling rate shown in FIG. 8.

When the filling is initiated, since the pressure of the tank 3 (inner pressure of the tank or pressure within the tank) is low, the hydrogen flows through the device 1C for varying a filling rate at a rapid flow rate due to a large pressure difference between the hydrogen source S and the tank 3. Meanwhile, the flow of the hydrogen is applied as a blast pressure to the valve element 31 to move the valve element 31 towards the downstream due to the blast pressure in an elastic manner (blast pressure>elastic force), whereby the valve element 31 is brought into closely contact with the valve seat 34.

Consequently, there is no clearance between the valve element 31 and the valve seat 34 to block the flow of the hydrogen. For this reason, the hydrogen is introduced into the tank 3 only through the narrow pilot passage 32. This restricts the hydrogen-filling rate. Once the hydrogen-filling rate is restricted, the exothermic heat due to the adiabatic compression becomes small and, therefore, the increase in the temperature within the tank is remarkably small.

On the other hand, at a middle filling state, the pressure within the tank is gradually increased and the pressure difference between the hydrogen source S and the tank becomes small. In this case, the blast pressure applied to the valve element 31 is decreased accordingly, and the valve element 31 is moved toward the upstream side (blast pressure<elastic force), which forms a clearance between the valve element 31 and the valve seat 34. When the clearance is formed as described above, the hydrogen flows not only through the pilot passage 32 but also through the clearance between the valve element 31 and the valve seat 34, which increases the hydrogen-filling rate.

It is noted that even if the hydrogen-filling rate is increased at this time, the exothermic heat is not so large as at the initial filling stage because the pressure ratio before and after the compression in the adiabatic compression becomes smaller than that at the initial filling stage.

At the final filling stage, since the pressure difference between the hydrogen source S and the tank 2 is further decreased (i.e., the blast pressure is decreased), the valve element 31 is moved toward the downstream at the fullest extent. Accordingly, the clearance between the valve element 31 and the valve seat 34 is wide-opened, whereby the hydrogen flows within the tank in a much more easy manner. Consequently, rapid hydrogen-filling can also be performed at the final filling stage.

Fourth Variant of Device for Varying Hydrogen-Filling Rate

Next, the fourth variant of the device for varying a filling rate other than the above embodiment will now be described by referring to FIG. 9. In the third variant, the device for varying a filling rate does not positively actuate, e.g., through a solenoid valve, but is operated in a passive manner.

FIG. 9 shows a cross-sectional view of a controller for varying a filling rate according to a fourth variant of the present invention.

As shown in FIG. 9, a device 1D for varying a filling rate is composed mainly of a valve element 41, a pilot passage 42, a pushing member 43, a valve seat 44, a housing 45, a joint 46 of inlet side, a joint 47 of outlet side, and the like. The symbol o indicates an O-ring for sealing. The symbol p is a pressure-bearing surface on which the valve element 21 receives the inner pressure.

Figure 9A:
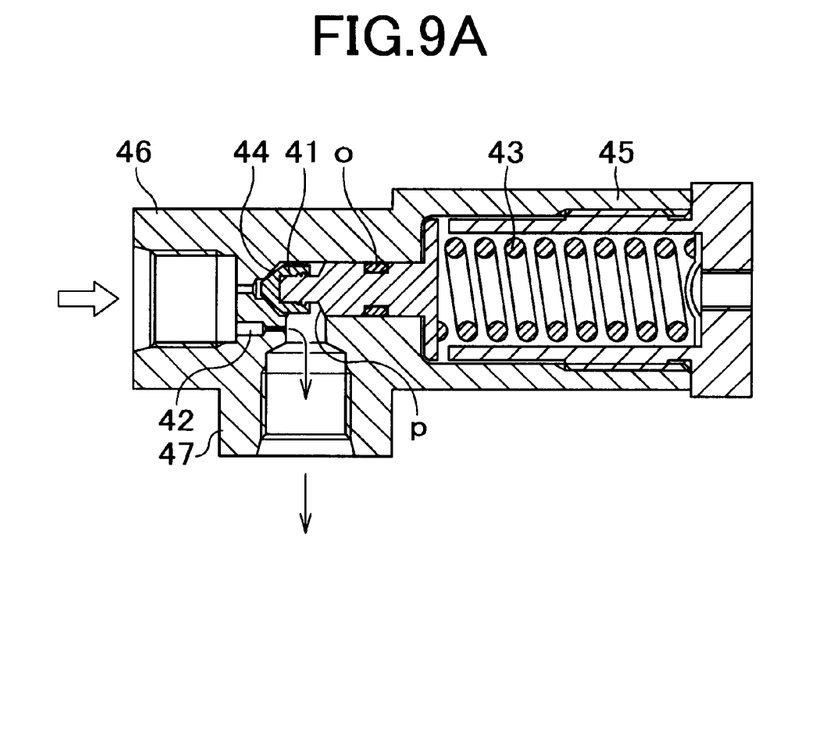
FIG. 9A shows the situation where the valve element is in contact with the valve seat.
Figure 9B:
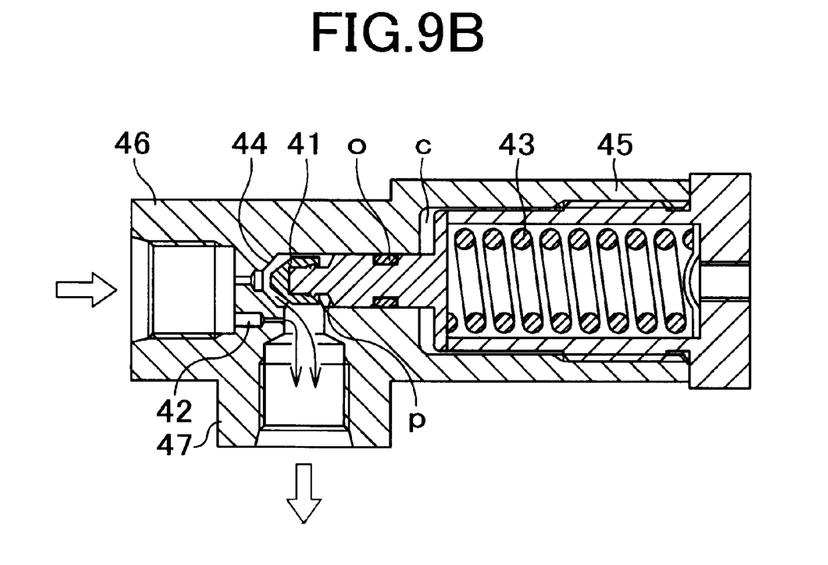
FIG. 9B shows the situation where the valve element is separated from the valve seat.

As shown in FIGS. 9A and 9B, the valve element 41 comprises a T-shaped member. Usually, the leg portion of the T-shaped valve element 41 is in closely contact with the valve seat 41 which will be described later on so as to block the flow of the hydrogen. The O-ring o is inserted into an approximately central portion of the leg portion of the T-shaped valve element 41 in order to keep the gas-tight (prevention from leakage and prevention from equalization). When the pressure within the tank becomes high, the pressure-bearing surface p is pushed to move the valve element 41 toward the right side as shown in FIG. 9B, whereby a clearance (hydrogen passage) for the hydrogen flowing between the valve element 41 and the valve seat 44 is secured.

The pilot passage 42 is provided within the valve element 41 not so as to be blocked even when the valve element 41 is brought into closely contact with the valve seat 44. Consequently, the pilot passage 42 always communicates the inlet of the device 1C for varying a filling rate (upstream side) with the outlet thereof (downstream side), irrelevant to the relation between the valve element 41 and the valve seat 44. The inner diameter (cross-section) of the pilot passage 42 is formed so that a filling rate in the case where the hydrogen is introduced only from the pilot passage 42 is surely lower than a filling rate in the case where the hydrogen is introduced both from the clearance between the valve element 41 and the valve seat 44 and the pilot passage 42.

The pushing member 43 comprises, for example, a spring. In the fourth variant, the pushing member 23 is a spring provided on the rear end side of the valve element based on the joint 46 of the inlet side. The pushing member 43 pushes the valve element 41 toward the upstream side (inlet). A pushing force generated by the pushing member 43 is in such a degree that in relation to the blast pressure which moves the valve element 41 toward the rear end side, the pushing member 43 moves the valve element 41 toward the upstream side to be brought into contact with the valve seat 44 when the pressure within the tank is low, and the valve element 41 is moved to the rear end side to separate the valve element 41 from the valve seat 44 (in such a degree that no clearance is formed).

The valve seat 44 in the fourth variant is formed at the downstream side of the joint 26 of the inlet side, and is brought into closely contact with the tip of the valve element 41 (the tip of the leg) when the valve element 41 is moved toward the upstream side.

The housing 45 is composed of a hollow cylindrical member, and accommodates the valve element 41 and the pushing member 43. The joint 36 of the inlet side is formed on the upstream side of the housing 45 and the joint 47 of the outlet side is formed on the downstream side thereof having an angle of 90° relative to the joint 46 of the inlet side.

The joint 46 of the inlet side and the joint 47 of the outlet side each possess a hollow passage which allows the hydrogen for flowing and serves as a joint for connecting the device 1D for varying a filling rate to the hydrogen pipe in a pressure-resistant sealing manner.

The mechanism for enlarging the passage used herein is mainly composed of the valve 41, the pushing member 43, the valve seat 44, and the like.

Next, the operation and the function of the device 1D for varying a filling rate according to the fourth variant will now be described (see FIGS. 1 and 9).

First, the hydrogen source S and the vehicle C are connected with each as in the above embodiment and the variant (the mouth ring Hm and the hydrogen inlet 2 are connected in a pressure-resistant sealing manner). The hydrogen filling from the hydrogen source S is initiated. In this case, the tank 3 is assumed to be substantially empty (0 MPa). Also, in this case, the device 1 for varying a filling rate shown in FIG. 1 should be replaced with the device 1D for varying a filling rate shown in FIG. 9.

When the filling is initiated, since the pressure of the tank 3 (inner pressure of the tank or pressure within the tank) is low, the hydrogen flows through the device 1D for varying a filling rate at a rapid flow rate due to a large pressure difference between the hydrogen source S and the tank 3. However, since the pushing force of the pushing member 43 shown in FIG. 9A is larger than the pressure within the tank (pressure within the tank>pushing force) in this case, the valve element 41 remains in contact with the valve element 44.

Consequently, there is no clearance between the valve element 41 and the valve seat 44 to block the flow of the hydrogen. For this reason, the hydrogen is introduced into the tank 3 only through the narrow pilot passage 22. This restricts the hydrogen-filling rate. Once the hydrogen-filling rate is restricted, the exothermic heat due to the adiabatic compression becomes small and, therefore, the increase in the temperature within the tank is remarkably small.

On the other hand, at a middle filling state, the pressure within the tank is gradually increased and, the pressure within the tank applied to the pressure-bearing surface p becomes large accordingly. In this case, the valve element 41 is moved toward the rear end side against the pushing force of the pushing member 43 (pressure within the tank>pushing force) to form a clearance c between the valve element 21 and the valve seat 44 (see FIG. 9). When the clearance is formed as described above, the hydrogen flows not only through the pilot passage 42 but also through the clearance, which increases the hydrogen-filling rate.

It is noted that even if the hydrogen-filling rate is increased at this time, the exothermic heat is not so large as at the initial filling stage because the pressure ratio before and after the compression in the adiabatic compression becomes smaller than that at the initial filling stage.

At the final filling stage, the pressure within the tank applied to the pressure-bearing surface p is further increased. Consequently, the valve element 41 is moved toward the rear end side against the pushing force of the pushing member 43 at the fullest extent, wide opening the clearance between the valve element 41 and the valve seat 44, whereby the hydrogen flows within the tank in a much more easy manner. Consequently, rapid filling can also be performed at the final filling stage.

As described above, the tank can be rapidly filled with the hydrogen by utilizing any of the devices 1A to 1D for varying a filling rate in the variants.

Apparatus and Process for Rapidly Filling Tank with Hydrogen Utilizing No Device for Varying Filling Rate Next, an apparatus and a process for rapidly filling a hydrogen tank with hydrogen utilizing no device for varying a filling rate will now be described.

Figure 10:
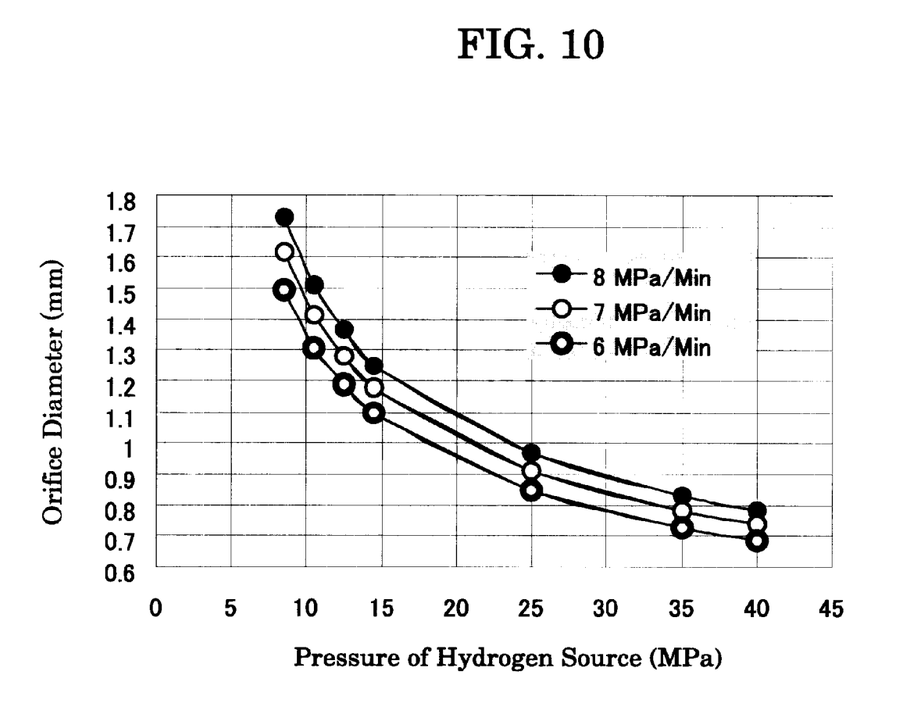
FIG. 10 is a graph showing the relation between the pressure of the source for supplying hydrogen (filling pressure) and the diameter of the orifice and a filling rate.

FIG. 10 is a graph showing the relation between the pressure of the source for supplying hydrogen (filling pressure) and the diameter of the orifice and a filling rate.

Whereas the orifice and the solenoid valve is used to fill the tank with the hydrogen in the above embodiment, the tank is filled with the hydrogen not utilizing any solenoid valve (bypass valve) but by utilizing only an orifice (restricting means).

First, the influences of the pressure of the hydrogen source (hydrogen supply pressure) and of the orifice diameter upon a filling rate will be described on the basis of FIG. 10. The horizontal axis in FIG. 10 indicates the pressure of the hydrogen source (hydrogen supply pressure) (MPa) and the vertical axis indicates the orifice diameter (mm).

It can be understood from this figure that, for example, when a filling rate of 6 MPa/min is desired to be obtained in the case where the hydrogen supply pressure is 40 MPa, the orifice diameter may be set to be approximately 0.7 mm. In this case, if the orifice diameter is set to be approximately 0.75 mm, the tank can be filled with the hydrogen at a filling rate of 7 Mpa/min. Similarly, if the orifice diameter is set to be approximately 0.8 mm, the tank can be filled with the hydrogen at a filling rate of 8 Mpa/min.

Also, it can be understood from this figure that, for example, when a filling rate of 6 MPa/min is desired to be obtained in the case where the hydrogen supply pressure is 25 MPa, the orifice diameter may be set to be approximately 0.85 mm. Also, in this case, if the orifice diameter is set to be approximately 0.9 mm, the tank can be filled with the hydrogen at a filling rate of 7 Mpa/min. Similarly, if the orifice diameter is set to be approximately 0.95 mm, the tank can be filled with the hydrogen at a filling rate of 8 Mpa/min.

With regard to any other hydrogen supply pressures, a filling rate can be similarly found from this figure. Specifically, by the selection of the hydrogen supply pressure and the orifice diameter (provided that the volume of the tank 3 is constant), a desired filling rate can be attained. Consequently, the tank can be filled with the hydrogen in which the temperature increase at the initial filling stage can be suppressed. As described above, since the filling efficiency can be enhanced if the temperature increase at the initial filling stage can be suppressed, the tank can be rapidly filled with the hydrogen.

It can be understood from FIG. 10 that in the case where the hydrogen supply pressure is not less than 15 MPa, a filling rate of not more than approximately 8 MPa/min can be attained if the orifice diameter is set to be not more than 1.5 mm. At a filling rate of 8 MPa/min, the range of increasing the temperature within the tank 3 at a peak is approximately 75° C. (see FIG. 4). Specifically, if the tank 3 has a temperature of 40° C., the temperature of the tank 3 is increased to approximately 120° C. It can be understood that the tank 3 may be made of a material having a pressure resistance of 120° C. It is noted that the temperature of 120° C. is less than the tolerance temperature level in the composite high pressure container comprising aluminum and a resin-made liner. If this composite high pressure contained can be used, the tank 3 can become a lightweight. Consequently, in the case where the tank is filled with the hydrogen from the hydrogen source whose hydrogen supply pressure is not less than 15 MPa, the orifice diameter is preferably set to be not more than 1.3 mm.

It can also be understood from FIG. 10 that setting the orifice diameter to be not more than 1 mm, a filling rate of not less than 8 MPa can be attained even if the hydrogen is supplied from the hydrogen source 3 having a hydrogen supply pressure of not less than 25 MPa. Specifically, the range of increasing the temperature can be set to be not more than 75° C. to attain the tank temperature of not more than 120° C. Consequently, in the case where the tank is filled with the hydrogen from the hydrogen source whose hydrogen supply pressure is not less than 25 MPa, the orifice diameter is preferably set to be not more than 1 mm.

While the present invention has been described above, it should be noted that the present invention is not restricted the embodiments and variants described previously and various modification and variants can be made without departing from the sprits and the scope of the present invention.

For example, while the vehicle is exemplified to described the apparatus and the process for rapidly filling a hydrogen tank with hydrogen according to the present invention, the present invention is not restricted to the application of the vehicle.

The device for varying a filling rate may be provided on any place of the passage connecting the hydrogen source to the hydrogen tank, and it is not necessarily provided on the vehicle. It is of possible to provide the device on the interior of the hydrogen source.

Also, the solenoid valve may be actuated through a stepping motor or such to alter the opening of the valve.

With regard to the device for varying a filling rate, the pilot passage is provided within the valve element, it can be provided at the contact surface between the valve element and the valve seat (in this case, it is provided so as to allow the hydrogen for flowing even if they are brought into contact with each other). For example, if a groove is formed on any of surfaces of the valve element and the valve seat, a pilot passage can be provided. In this case, the groove can be processed only by caving or pressing the surface of the valve element or the valve seat; thus, the device can easily be produced. Also, in the case of the blockage by dusts and the like, they can easily be removed. In the configuration where both the orifice and the solenoid valve are used, when a groove is provided on at least one of the valve element and the valve seat of the solenoid valve, the orifice and the solenoid valve can be unified with each other, reducing the space for installation of the device.

What is claimed is:

1. An apparatus for rapidly filling a hydrogen tank with a hydrogen gas comprising:
    a hydrogen source;
    a hydrogen tank;
    a passage which connects said hydrogen source and said hydrogen tank; and
    a mechanism for varying the hydrogen-filling rate depending upon the pressure within said hydrogen tank, wherein said mechanism increases the hydrogen-filling rate when the pressure within said hydrogen tank is increased.

2. The apparatus as claimed in claim 1, wherein said mechanism for varying a hydrogen-filling rate comprises a filling rate variable valve having a function of changing the hydrogen filling rate depending on the pressure within the hydrogen tank at the time of hydrogen-filling.

3. The apparatus as claimed in claim 2, wherein said valve possesses a valve element which is movable depending upon the pressure within the hydrogen tank to allow the hydrogen to be introduced for flowing through a passage formed between said valve element and valve seat, and wherein said passage is widened to increase the hydrogen-filling rate, when the pressure within the tank is increased.

4. The apparatus as claimed in claim 3, at least one of said valve element and said valve seat possesses at least one orifice so that even if said passage formed between said valve element and said valve seat is closed due to a low pressure within the hydrogen tank, the hydrogen tank is filled with hydrogen through said orifice.

5. The apparatus as claimed in claim 3, wherein said valve element is moved by a pushing member.

6. The apparatus as claimed in claim 4, wherein said valve element is moved by a pushing member.

7. The apparatus as claimed in claim 5 or 6, wherein said pushing member comprises a spring.

8. The apparatus as claimed in claim 1, wherein said mechanism comprises a valve, a sensor which detects the pressure within the hydrogen tank, and a controller which controls said valve to vary the hydrogen-filling rate depending upon the pressure detected by said sensor.

9. The apparatus as claimed in claim 8, wherein said controller controls the valve such a manner that the hydrogen gas is introduced into said hydrogen tank at a first hydrogen-filling rate when the pressure within the hydrogen tank is lower than a predetermined pressure, while the hydrogen gas is introduced into said hydrogen tank at a second hydrogen-filling rate which is higher than said first hydrogen filling rate when the pressure within the hydrogen tank is not lower than the predetermined pressure.

10. The apparatus as claimed in claim 8 or 9, wherein said valve used varies the hydrogen-filling rate via a stepping motor.

11. A process for rapidly filling a hydrogen tank with a hydrogen gas from a hydrogen source by connecting said hydrogen tank with said hydrogen source comprising:

initiating the introduction of hydrogen from said hydrogen source into said hydrogen tank; and increasing the hydrogen-filling rate depending upon the pressure within said hydrogen tank, wherein the hydrogen-filling rate is increased when the pressure within the hydrogen tank is increased.

12. The process as claimed in claim 11, wherein the hydrogen filling rate is continuously changed depending upon the pressure within the hydrogen tank.

13. The process as claimed in claim 11, wherein the hydrogen filling rate is increased, when the pressure within the hydrogen tank exceeds a predetermined threshold value.

14. An apparatus for rapidly filling a hydrogen tank with a hydrogen gas comprising:

a hydrogen source;

a hydrogen tank;

a passage which connects said hydrogen source and said hydrogen tank; and a mechanism for varying the hydrogen-filling rate depending on the pressure within the hydrogen tank, wherein the mechanism allows the hydrogen gas to be introduced into said hydrogen tank at a first hydrogen-filling rate when the pressure within the hydrogen tank is lower than a predetermined pressure, and wherein the hydrogen gas is introduced into said hydrogen tank at a second hydrogen-filling rate which is higher than said first hydrogen-filling rate when the pressure within the hydrogen tank is not lower than the predetermined pressure.

15. An apparatus for rapidly filling a hydrogen tank with a hydrogen gas comprising:

a hydrogen source;

a hydrogen tank;

a passage which connects said hydrogen source and said hydrogen tank; and a mechanism comprising a filling rate variable valve for varying the hydrogen-filling rate depending upon the pressure within said hydrogen tank at the time of hydrogen-filling, and for introducing the hydrogen gas into the hydrogen tank at a high filling rate when the pressure in the hydrogen tank is increased, wherein the filling rate variable valve includes a valve seat and a valve element that is moveable in response to the pressure within the hydrogen tank to allow the hydrogen gas to be introduced for flowing through a passage formed between said valve element and valve seat, wherein said passage formed between the valve element and the valve seat is widened to increase the hydrogen-filling rate when the pressure within the tank is increased.

16. The apparatus as claimed in claim 15, wherein at least one of said valve element and said valve seat possesses at least one orifice so that even if said passage formed between said valve element and said valve seat is closed due to a low pressure within the hydrogen tank, the hydrogen tank is filled with hydrogen through said orifice.

17. The apparatus as claimed in claim 15, wherein said valve element is moved by a pushing member.

18. In an apparatus for rapidly filling a hydrogen tank with a hydrogen gas, a mechanism for varying a hydrogen-filling rate comprising:

a filling rate variable valve having a valve seat and a valve element that is moveable in response to the pressure within the tank to allow the hydrogen gas to be introduced for flowing through a passage formed between said valve element and valve seat, wherein said passage formed between the valve element and the valve seat is widened to increase the hydrogen-filling rate when the pressure within the tank is increased.

19. The apparatus as claimed in claim 18, wherein at least one of said valve element and said valve seat possesses at least one orifice so that even if said passage formed between said valve element and said valve seat is closed due to a low pressure within the hydrogen tank, the hydrogen tank is filled with hydrogen through said orifice.

20. The apparatus as claimed in claim 18, wherein said valve element is moved by a pushing member.

* * * * *